Aug. 28, 1923.
P. J. MURRAY ET AL
1,465,993
SHOCK ABSORBER
Filed July 29, 1922
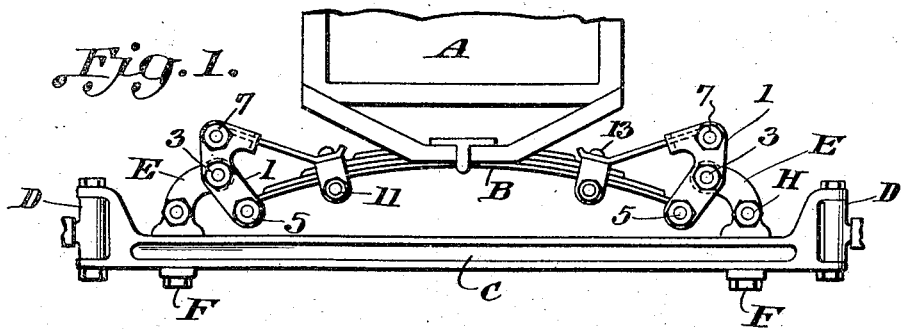
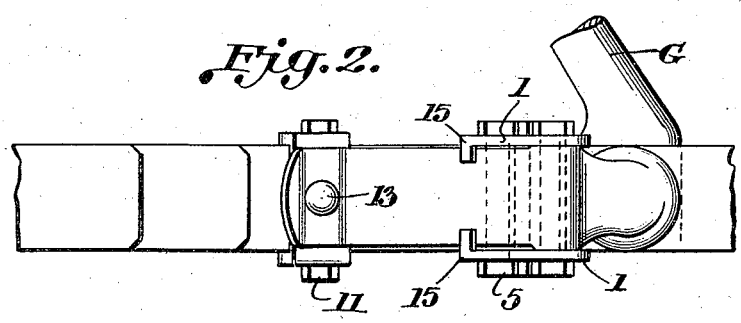
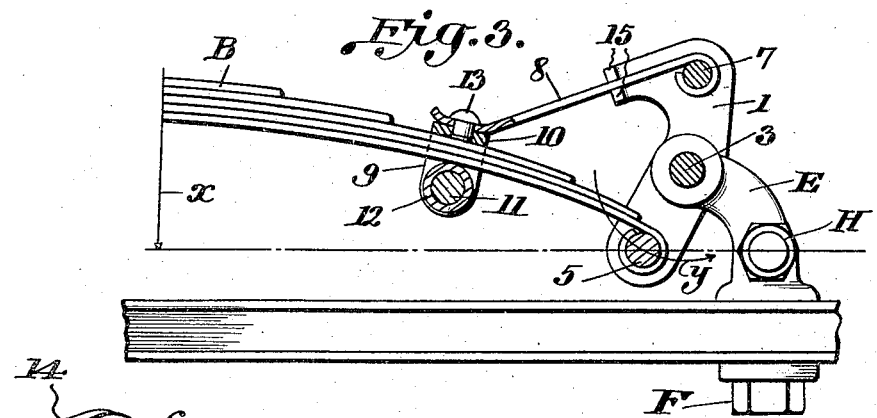
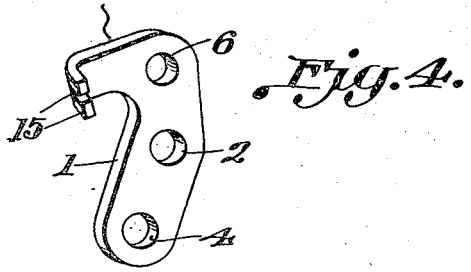
Inventors
Patrick J. Murray
Matthew L. Clark
by their Attorneys
Baldwin & Wight Patented Aug. 28, 1923.

1,465,993

UNITED STATES PATENT OFFICE.

PATRICK J. MURRAY AND MATTHEW L. CLARK, OF CARBONDALE, PENNSYLVANIA.

SHOCK ABSORBER.

Application filed July 29, 1922. Serial No. 578,408.

*To all whom it may concern:*

Be it known that we, PATRICK J. MURRAY and MATTHEW L. CLARK, citizens of the United States, and residents of Carbondale, in the county of Lackawanna and State of Pennsylvania, have invented certain new and useful Improvements in Shock Absorbers, of which the following is a specification.

Our invention relates to a shock absorber for the springs of a motor vehicle, and as illustrated is shown as applied to a Ford vehicle, although it is applicable to other types of machines.

An object of the invention is to provide such a device that can be applied to the machine with little or no change in the structure thereof, and will aid in preventing shocks, thereby giving a more efficient spring support for the chassis of the vehicle.

A further object of the invention is to provide such a device that will be efficient in controlling or preventing side rocking of the chassis.

Other objects will be apparent from the following detailed description and the appended claims.

In the drawings:

Figure 1 is a perspective view showing the front spring with the invention applied thereto;

Figure 2 is a top plan view.

Figure 3 is a side elevation, partly in section.

Figure 4 is a perspective view of a portion of the attachment.

As shown the chassis A of a motor vehicle is supported by a spring B over the front axle C provided with the usual wheel spindles or stub axles D. Posts or brackets E are fastened to the axle C by means of nuts F, and a brace G is attached to the post by a nut H. These elements may be of any old or desired construction and our invention involves the use of the same without modification.

Members 1, shown in detail in Figure 4, are stamped out of sheet metal and are provided with central openings 2 whereby they fit upon a bolt 3 which passes through the upper end of the post E. These members are employed in pairs, as clearly shown in Figure 2, and there is one at each side of the end of the spring B. At the lower end of each member 1 is provided a hole 4 and a bolt 5 passes through these holes in a pair of complementary members. The end of the spring B is attached to this bolt as clearly shown in Figure 3. Another hole is provided in the upper end of each member 1 and through these holes in each pair of members 1 passes a bolt 7 that serves as a support for one end of an auxiliary spring 8 which is of substantially the same width as the spring B. This spring 8 may be a simple or a compound spring.

A shackle 9 is stamped out of sheet metal and its ends turned at right angles to the body 10 to form ears. These ears are provided with openings and through the openings is passed a bolt 11. In addition to retaining the shackle 9 in position on the spring B as illustrated, the bolt 11 also holds in position a roller 12 which engages the under surface of the spring B.

The body 10 of the shackle is provided with a hole and the free end of the spring 8 is provided with a registering hole. The shackle 9 and spring 8 are secured together by a rivet 13 passed through these holes.

The upper end of each member 1 is extended to form an arm 14 which has its end slit as shown to form ears 15 which are bent inwardly at substantially right angles to the arm portion 14. The edge of the spring 8 is adapted to fit between these ears, thus preventing free movement of the spring 8 relative to the members 1.

When the spring B moves downward relatively to the axle C as indicated by the arrow $x$ in Figure 3, the bolt 5 to which the spring B is attached moves outward in the arc of a circle as indicated by the arrow $y$ in the same figure. This produces an inward movement of the upper end of the member 1 and tends to flex the spring 8, the inner end of which can move longitudinally of the spring B due to the roller 12 carried by the shackle. The two springs therefore act against each other and the shock is thereby reduced. On any rebound, when the spring B is moving away from the axle C, a similar action will take place with the upper end of the member 1 then moving outwardly.

Any tendency to side movement which would move both bolts 5 to which the spring is attached toward one side of the vehicle, would bring about the same change in relation between the two springs B and 8 and such side movement will be cushioned and in the main prevented.

It will be observed that our device is very simple and easy to construct and apply. The members 1 and the shackles can all be stamped out of sheet metal, and are interchangeable except that the ears 15 on a part must face in one direction and on others in the opposite direction. The bolts 3, 5, 7, and 11 can be made the same size and interchangeable. No change in the framework of the machine is necessary, and the device may be applied to cars in use with little trouble.

Slight changes may be necessary in the application of the device to vehicles of different types, and detail modifications may be made without in any way departing from the spirit of the invention, which is to be regarded as limited only by the claims.

We claim as our invention:

1. A shock absorber adapted to be used with the usual axle supported posts and chassis supporting spring of a vehicle, comprising members pivotally carried by said posts and to the lower ends of which said spring is connected, an auxiliary spring carried by the upper end of the members, a shackle surrounding the supporting spring and connected to the auxiliary spring, and means on said members engaging the edges of the auxiliary spring to hold it against free movement relative to the members.

2. A shock absorber adapted to be used with the usual axle supported posts and chassis supporting spring of a vehicle, comprising a pair of members pivotally carried by each of said posts and to the lower ends of which said spring is connected, an auxiliary spring carried by the upper ends of each pair of members, a shackle surrounding the supporting spring and connected to the free end of the auxiliary spring, and inwardly bent ears on said members engaging the edges of the auxiliary spring to hold it against free movement relative to the members.

3. A shock absorber adapted to be used with the usual axle supported posts and chassis supporting spring of a vehicle, comprising a pair of members pivotally carried by each of said posts and to the lower ends of which said spring is connected, an auxiliary spring carried by the upper ends of each pair of members, a shackle surrounding the supporting spring and connected to the free end of the auxiliary spring, a roller carried by said shackle and engaging the supporting spring, and inwardly bent ears on said members engaging the edges of the auxiliary spring to hold it against free movement relative to said members.

4. Spring supporting mechanism for vehicles comprising an axle, posts rising therefrom, a pair of members pivotally supported near their middle points on each post, a main spring carried by the lower ends of said members, an auxiliary spring carried by the upper ends of said members at each end of the main spring and having its free end loosely shackled to the main spring, and an arm on each member having ears engaging the adjacent edge of the auxiliary spring.

In testimony whereof, we have hereunto subscribed our names.

PATRICK J. MURRAY.
MATTHEW L. CLARK.